United States Patent [19]

Hennessey

[11] 4,442,477

[45] Apr. 10, 1984

[54] STEERING LIGHT ARRANGEMENT

[75] Inventor: Richard G. Hennessey, Oak Lawn, Ill.

[73] Assignee: International Harvester Co., Chicago, Ill.

[21] Appl. No.: 333,206

[22] Filed: Dec. 21, 1981

[51] Int. Cl.³ .......................... B60Q 1/12; B60Q 1/24
[52] U.S. Cl. ........................................ 362/52; 362/57; 362/83; 180/900; 280/164 R
[58] Field of Search ....................... 362/37, 38, 39, 43, 362/44, 49, 50, 51, 52, 53, 54, 57, 59, 61, 66, 70, 71, 72, 78, 83, 193, 382; 180/900, 906; 280/164 R, 156, 157, 153 B, 152.1; 174/130, 103 R, 103 S; 362/193, 382; 340/100, 134; 296/198; 293/103, 105, 119, 123

[56] References Cited

U.S. PATENT DOCUMENTS

| | | | |
|---|---|---|---|
| 1,412,911 | 4/1922 | Anthony | 362/37 |
| 1,521,978 | 1/1925 | Vincent et al. | 362/37 |
| 1,611,392 | 12/1926 | Thompson | 362/37 X |
| 1,621,920 | 3/1927 | Berry et al. | 362/37 |
| 1,622,439 | 3/1927 | Frue | 362/54 |
| 1,656,561 | 1/1928 | Hughes et al. | 240/62 |
| 2,018,530 | 10/1935 | Pawsat | 280/152.1 |
| 2,041,315 | 5/1936 | Barclay | 362/83 X |
| 2,124,222 | 7/1938 | Wiley | 362/72 |
| 2,675,464 | 4/1954 | Schwinn | 362/72 |
| 2,796,140 | 6/1957 | Knolle | 180/900 X |
| 2,796,515 | 6/1957 | Waskie | 240/7.1 |
| 2,902,592 | 9/1959 | Cole et al. | 174/69 X |
| 3,415,983 | 12/1968 | McGee | 240/8.25 |
| 4,074,786 | 2/1978 | Joubert | 280/164 R X |

FOREIGN PATENT DOCUMENTS 2526490  12/1976  Fed. Rep. of Germany ........ 362/72

OTHER PUBLICATIONS

John Deere Co. Brochure on the JD 860 Scraper, pp. 1–7.

Primary Examiner—David H. Brown
Assistant Examiner—John E. Griffith, Jr.
Attorney, Agent, or Firm—Boris Parad; F. David Aubuchon

[57] ABSTRACT

A steerable and height adjustable light pod comprising a multi-directional light emitting means is mounted atop a vehicle guide wheel for synchronous angular movement therewith.

6 Claims, 5 Drawing Figures

U.S. Patent   Apr. 10, 1984   Sheet 1 of 2   4,442,477
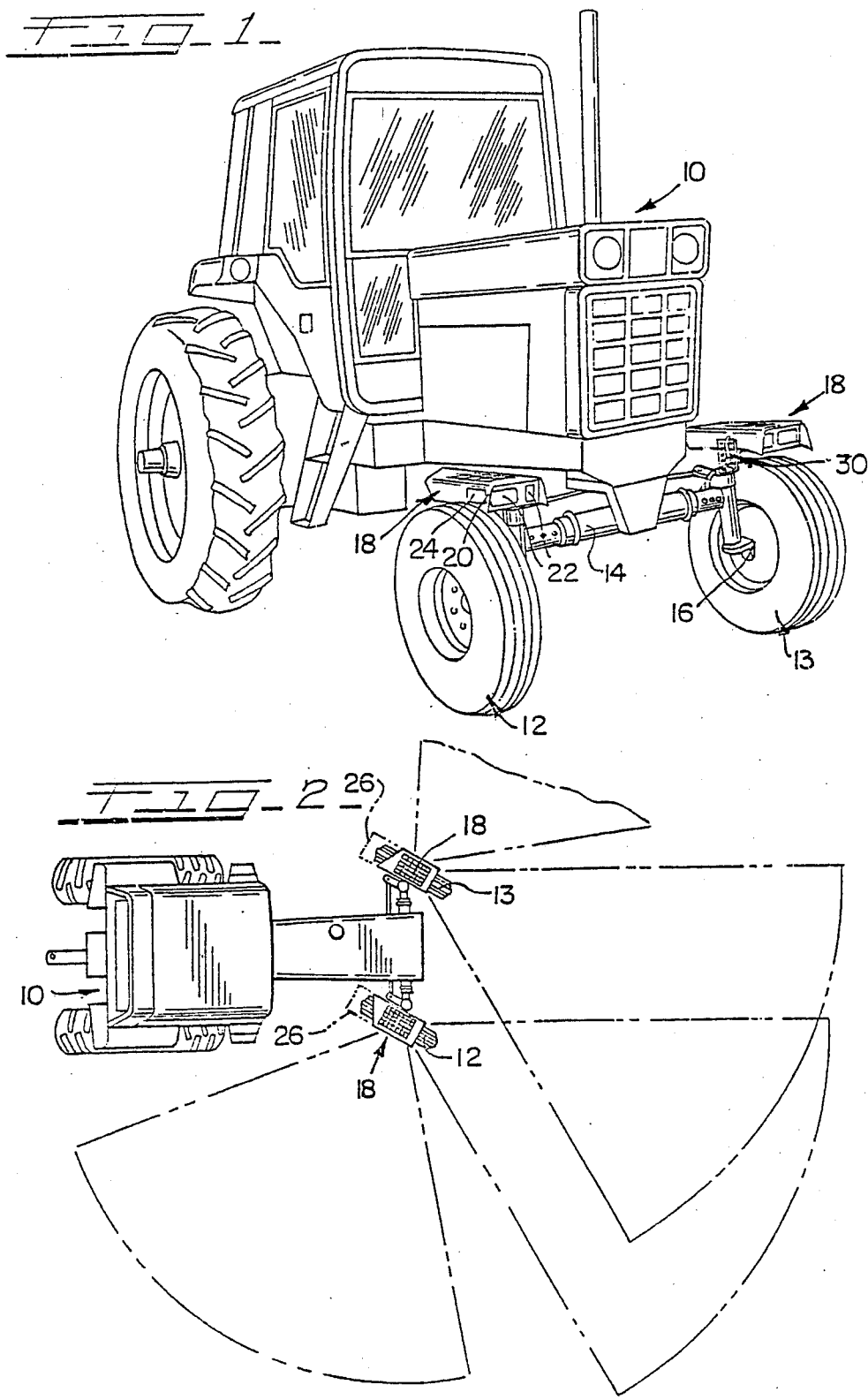

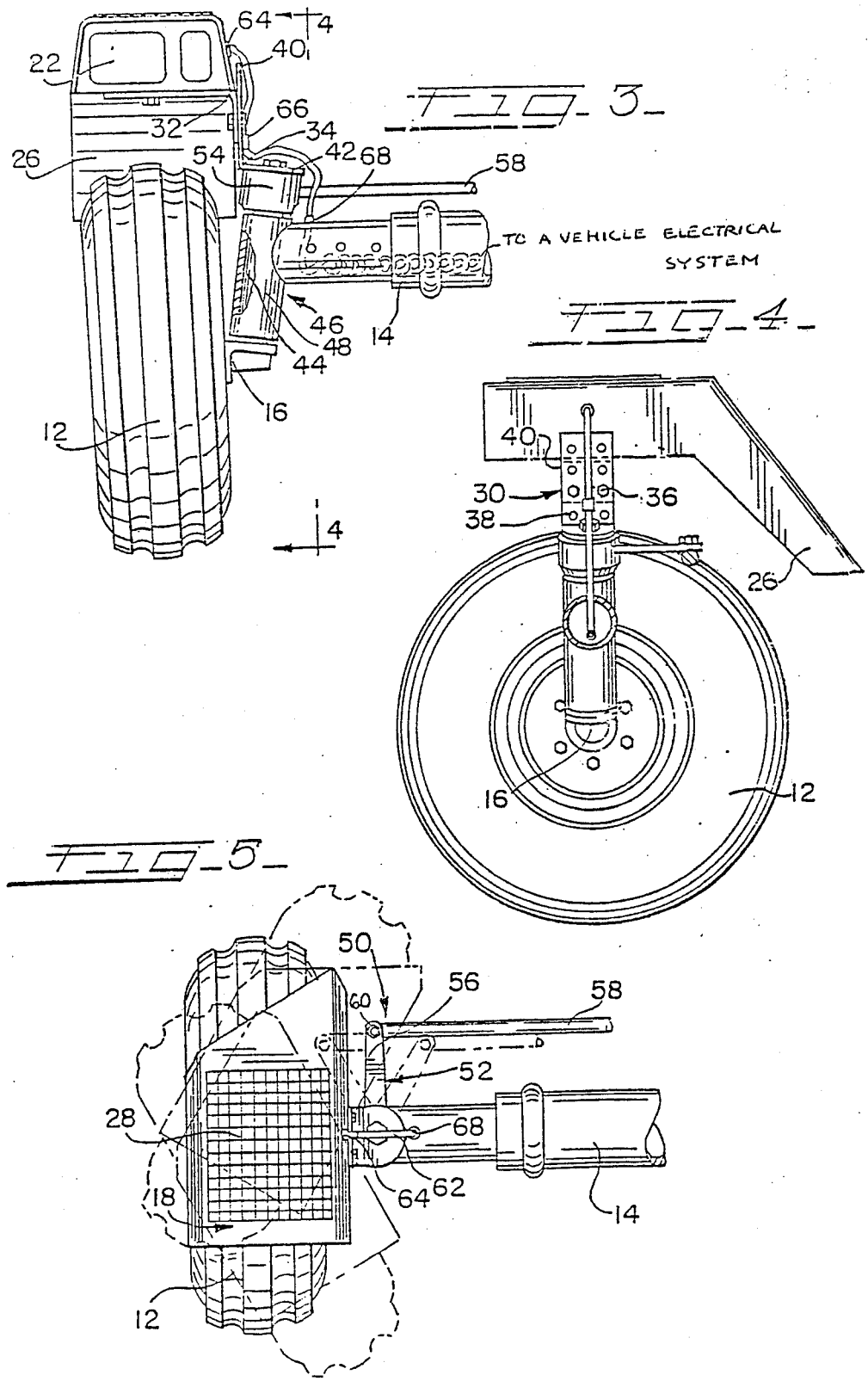

STEERING LIGHT ARRANGEMENT

BACKGROUND OF THE INVENTION

1. Field of the Invention

This invention relates to a headlight arrangement for vehicles and more particularly to a headlight arrangement synchronously and angularly moveable with a vehicle guide wheel.

2. Description of the Prior Art

Heretofore, various types of headlight assemblies have been utilized in the prior art which have headlight members interconnectedly steering the mechanism of the vehicle so as to rotate the headlight members in conjunction with the turning movement of the front wheels to maintain a lighted area in the direction of the vehicle movement. For instance, the U.S. Pat. No. 3,415,983 discloses a headlight arrangement for a vehicle which is hydraulically operated and connected to the power steering mechanism of the vehicle operable to transform turning movements through hydraulic fluid pressure and piston cylinder assemblies to move the interconnected headlight members in response to turning movement of the vehicle.

Another U.S. Pat. No. 2,796,515 discloses an extensible vehicle lamp connected to one of the cylinders which are telescopically connected to each other, so that upon extension of said cylinders the lamp is moved forwardly of the vehicle front bumper.

Further, the U.S. Pat. No. 1,656,561 discloses a dirigible headlight connected to a cylinder piston whereby the headlights are oscillated as the piston is reciprocated.

The current pattern of ground illumination in front of the land vehicle, such as an agricultural tractor, loader or the like vehicle, presents visibility problems for a vehicle operator. The cab mounted work lamps brightly illuminate the rear portion of the steering tires of a tractor and the ground behind these tires. This light also passes between the front tires and the tractor sheet metal to illuminate the ground just in front of the front axle. The problem with this light pattern is that the front tires block the area in front of and beyond these front tires. Thus, the operator, in the field operation, must follow the furrow by watching it come out from behind the front tire rather than guide the tractor into the furrow by looking forward beyond the tire.

The light from the headlights does not help the operator see just beyond the front tires either, because these lights which are mounted high in the front grill can only project their light far out into the field. They do not point down enough to cover the ground which needs to be lit, and they are not strong enough to brightly light what they do shine onto. Neither the headlamps nor the work lamps shine on the ground where the tractor is about to go when the tractor is executing a sharp turn.

None of the prior art references of record disclose or teach a novel steering light arrangement, which eliminates the above described problems, as disclosed in the subject invention hereinbelow.

SUMMARY OF THE INVENTION

According to the invention, a steering light arrangement is mounted on a land vehicle and connected to at least one vehicle guide wheel for synchronous angular movement therewith. The arrangement comprises a lamp pod located above and in close proximity to the guide wheel and comprising multi-directional light emitting means. The guide wheel has an axle which is mechanically connected to a vehicle steering means for rotating the axle in a substantially horizontal plane. A lamp pod support element rigidly connects the pod with the steering mechanism. The lamp pod support element comprises an extendible bracket facilitating adjustment of the light pod location correlating to various wheel dimensions.

BRIEF DESCRIPTION OF THE DRAWINGS

FIG. 1 is a perspective view of a vehicle having a multi-directional light emitting pod mounted on top of each guide wheel of the vehicle;

FIG. 2 is a vehicle top view showing an angular position of the guide wheels with the light emitting pods and fenderlets shown in phantom lines;

FIG. 3 is a front view of the guide wheel and light emitting fenderlet arrangement;

FIG. 4 is a side view taken substantially along the line 4—4 of FIG. 3; and

FIG. 5 is a blown-up top view of the light emitting pod showing different wheel positions in phantom lines.

DESCRIPTION OF THE PREFERRED EMBODIMENT

Referring now to the drawings wherein reference characters designate like or corresponding parts therethrough the several views, there is shown in FIG. 1 a land vehicle which will be referred hereinafter as, only by way of an example, a tractor 10. The tractor 10 has a pair of front guide wheels 12 and 13 interconnected by a bolster 14. Each of the guide wheels has an axle 16.

A lamp or light pod 18 is located in a close proximity to the guide wheel 12 and comprises a multidirectional light emitting means 20. The light emitting means 20 includes a headlight lamp 22 and a flood lamp 24. The flood lamp 24 generates a wide angle beam light illuminating the territory along a vehicle side and substantially transversely to the line of the guide wheel movement, thereby complementing the area illuminated by the headlamp 22. The headlamp 22 is aimable in order to give the proper ground cover generally in the direction of the vehicle movement and being able to change its light intensity. This would give good field illumination yet not blind oncoming drives on the road. As the tractor operator drives through the field he can easily see the end of the field coming, the groundwork during the last path, the ground he is passing over now, and the ground he will be on during the next pass due to the complementing illumination of the ground by both lamps, as shown in FIG. 2.

The light pod 18 is assembled in a fenderlet 26 covering the front wheel 12 as shown in FIG. 2 (phantom lines), 3 and 4. The top of the light pod 18 has an anti-slip structure 28, either integral with the light pod 18 or attachable thereto, so that an operator servicing the tractor engine can firmly stand upon it, if necessary.

As seen in FIGS. 3, 4 and 5, the light pod 18 is held by an extendable support bracket 30 which can be divided in two parts, upper 32 and lower 34 brackets or angles. It is also possible to make the bracket 30 telescopically extendible. The bracket 30 has several height settings available in order to allow optimum positioning of the lamp pod 18 fenderlets 26 for all front tire options available for this tractor. The height adjustment of the light pod 18 is accomplished by affixing both brackets or angles 32 and 34 together by bolts 36, or other suitable mechanical means, projecting through the apertures 38 in a flange 40 of the bracket 34. The lower bracket 34 has a flange 42 extending inwardly toward the other guide wheel 13. A guide wheel axle 16 is integrally affixed to a kingpin 44 which protrudes through the flange 42. The kingpin post 46 comprises a kingpin 44 encompassed by a kingpin sleeve 48 which is integrally affixed to the bolster 14.

Steering means 50 comprises a steering arm 52, one end thereof 54 being rigidly attached to the kingpin 44 and the flange 42. Another end 56 of the arm 52 is pivotally connected to a tie rod 58 at the joint 60. The tie rod 58 is connected to the vehicle steering system, which is not shown in the drawings, governed by the tractor operator. The vehicle steering mechanism reciprocally moves the steering arm 52 which correspondingly turns the guide wheels 12 and the light pods 18 in the same direction.

An electrical conduit 62 exiting from the lamp pod 18 at 64 is attached to a lower support bracket 34 by a clamp 66. The conduit 62, which can be an electrical wire in a plastic shell, then enters the bolster 14 at 68 on its way to the vehicle wiring harness (not shown). The placement of the wire 62 in the bolster 14 will also protect it from the field exposure and damage. The wire or conduit 62 going through the bolster 14 is coiled, telephone receiver style, to accommodate fluctuation in different wheel dimensions.

In operation, when a vehicle operator actuates the vehicle steering mechanism, a tie rod 58 moves the steering arm 52. The arm 52 rigidly connected to the guide wheel 16 and the light pod 18 will turn the wheel 12 and pod 18 synchronously in the same direction. The headlight and flood lamps in light pods not only turn with the guide wheels but also adjust with the front guide wheels for various tread settings. The light pod location near the tires provides higher fringe lighting intensity and also widely spaced head lamps provide wider field and road illumination patterns. In the tractor field operation the light pod location places the lamp between rows where the wheel is operating or directly above the furrow in many plowing operations of the tractor. Lamps directionally turn with the wheel thereby lighting the area that a machine is about to enter. Due to the lamps lower location it is less likely that the light will blind the approaching driver in highway conditions. Also, such a location better defines the tractor width at night for oncoming traffic. If the lamps are utilized for a loader, then the light location will facilitate better visibility of loader bucket edges and adjacent areas during steering conditions.

An adjustable height support bracket which may have several height settings or telescopically extendible will provide optimum positioning of the lights for all tire options available for this vehicle. The light pod and the light emitting means contained therein will turn with the tire as the tractor is steered because the steering arm rotating the wheel axle will also rotate the light pod. As the tractor turns, the outside flood lights still illuminate the row or object being avoided. The inside flood light shines back toward the inside radius of the turn. It illuminates the implement and allows proper placement of the implement guide wheel, thus ensuring proper row width between separate paths over the field right out to the rows end. The operator does not have to guess about his implement placement before it comes into the view of the rear work lights.

An additional advantage of the location of the pod comes in the transport condition when the lights have defined the tractor width to an oncoming traffic. Also, the side flood lights shine back onto the rear tires and, to some extent, onto whatever is being pulled behind, if it is wider yet. The driver of an oncoming vehicle can more easily see the true width of this overall farm machine.

The headlamps project light far enough forward to easily light objects early enough for the operator to avoid them even when the tractor is moving at full road speed. The headlamps also illuminate the ground just ahead of the tire as well, thus the furrow is easily seen right up to the tire and the tractor may be accurately guided into the exact location desired. A set of flood lamps mounted on the outside face of each pod emits the wide angle beam covering around the entire sides of the tractor. If the cab mounted work lamps are turned on, all the ground ahead of, beside, and under the tractor is very well illuminated. The headlights may have a changing intensity light bulb or similar means. This would give good field illumination yet not blind oncoming drivers on the road.

The headlights and a set of work or flood lights are mounted in fenderlets, which are attached to the front wheel steering arms, close enough to the front tires to fully cover the area in front of the tractor. At the same time, they are high enough to project the light far enough out toward the front to enable the operator to easily see oncoming objects even when going at full road speed.

The foregoing description and drawings merely illustrate the invention and the invention is not limited thereto, except insofar as the appended claims are so limited, and so those skilled in the art who will have the disclosure before them will be able to make modifications and variations therein without departing from the scope of the invention.

I claim:

1. A steering light arrangement mounted on a land vehicle and connected to at least one vehicle guide wheel for synchronous angular movement therewith comprising:
 a height adjustable fenderlet, partially covering said guide wheel and synchronously rotatable therewith, including a built-in light pod located above and in close proximity to said guide wheel and comprising multi-directional light emitting means;
 said guide wheel having an axle mechanically connected to a vehicle steering mechanism for rotating said axle and said wheel in a substantially horizontal plane;
 a fenderlet support element rigidly connecting said pod with said steering mechanism and
 said fenderlet support element comprising an extendible bracket facilitating adjustment of said fenderlet location correlating to various dimensions of said guide wheel;
 said light emitting means comprising a headlight lamp lighting the area essentially aligned with the line of a guide wheel movement and a flood lamp generating a wide angle beam light illuminating a territory along a vehicle side and substantially transversely to the line of said guide wheel movement;
 said vehicle comprising another fenderlet with its light pod mounted on another guide wheel;
 said another guide wheel interconnected with said one guide wheel via a bolster;

said light pods being independently interconnected with said vehicle steering mechanism;

an electrical conduit connecting said light emitting means with a vehicle electrical system, and said conduit disposed within said bolster;

said light emitting means defining a vehicle width in all wheel positions.

2. The light arrangement according to claim 1, and said extendible bracket removably connected to said steering mechanism; and said bracket comprising two angles detachably affixed to each other in order to secure said light pod in various positions.

3. The light arrangement according to claim 1, and a steering arm having one end removably connected and moveable together with said support element and another end pivotally attached to a tie rod operatively linked with said vehicle steering mechanism;

a kingpin post comprising a kingpin integrally connected to said guide wheel axle and holding together a steering arm, support element and guide wheel axle;

said kingpin having a portion thereof being enclosed by a kingpin sleeve.

4. The light arrangement according to claim 1, and said light pod comprising an anti-slip protection structure located on a top surface thereof to facilitate a stabilized standing thereon.

5. A steering light arrangement mounted on a land vehicle with a pair of guide wheels for a synchronous angular movement therewith and comprising;

said guide wheels interconnected by a bolster;

a height adjustable fenderlet with a built-in light pod disposed atop of each of said guide wheels;

a light emitting means disposed each said light pod;

said light emitting means comprising a headlamp illuminating the objects and the ground generally in the direction of the vehicle movement and a wide angle flood lamp illuminating the space along a vehicle side thereby complementing the area illuminated by said headlamp;

a height adjusting support bracket rigidly attached to said fenderlet;

a kingpin rigidly securing said bracket to one of said guide wheels;

said light emitting means being electrically connected to a vehicle electrical system;

said fenderlet, kingpin and guide wheel steerable in the same direction by a vehicle steering mechanism;

a steering arm removably connected to said support bracket and said kingpin; and a tie rod pivotally attached to said steering arm and to said vehicle steering mechanism, thereby reciprocably moving said steering arm for turning said guide wheel and said fenderlet in the same direction;

said light emitting means further comprising an electrical conduit disposed within the confines of said bolster.

6. The light arrangement according to claim 5, and said electrical conduit exiting from said light pod and entering said bolster near said kingpin;

said conduit being coiled within said bolster to prevent field damage thereto and facilitating the light pod adjustment.

* * * * *